United States Patent [19]

Montesi et al.

[11] 4,329,546

[45] May 11, 1982

[54] INTERFACE UNIT FOR PUSHBUTTON SELECTOR

[75] Inventors: Vittorio Montesi; Mario Besi, both of Milan, Italy

[73] Assignee: Societa Italiana Telecomunicazioni Siemens S.p.A., Milan, Italy

[21] Appl. No.: 154,091

[22] Filed: May 28, 1980

[30] Foreign Application Priority Data

Jun. 5, 1979 [IT] Italy ............................... 23279 A/79

[51] Int. Cl.³ ............................................ H04M 1/44
[52] U.S. Cl. ................................ 179/81 R; 179/90 K; 179/16 EC
[58] Field of Search ........... 179/16 EC, 81 R, 84 VF, 179/90 K

[56] References Cited

U.S. PATENT DOCUMENTS 3,956,596  5/1976  Connolly et al. .................. 179/90 K
3,973,084  8/1976  Hovland ............................ 179/90 K
4,008,379  2/1977  Watkins ............................ 179/16 EC Primary Examiner—Bernard Konick
Assistant Examiner—J. A. Popek
Attorney, Agent, or Firm—Karl F. Ross

[57] ABSTRACT

An interface unit inserted between a subscriber line of a telecommunication system and a generator of dial pulses, including a signal converter associated with a pushbutton selector and a memory for the temporary storage of selected digits, comprises a rectifier bridge in series with an impedance network which includes a shunt branch with two complementary transistors interconnected in a positive-feedback circuit and a low-threshold Zener diode in series with one of these transistors across which a reduced supply voltage for the pulse generator remains available when the shunt branch becomes conductive with saturation of the transistors upon a closure of the subscriber's hook switch. An enabling signal for the pulse generator is emitted from the shunt branch upon such conduction. An ancillary transistor, with an input connection across a small series resistor of the network, and a further Zener diode in parallel with the shunt path protect the components thereof against overcurrents and overvoltages.

15 Claims, 3 Drawing Figures

INTERFACE UNIT FOR PUSHBUTTON SELECTOR

FIELD OF THE INVENTION

Our present invention relates to an interface unit designed for insertion into a line loop of a telecommunication system, in series with a hook switch, for receiving dial pulses from a pulse generator including a call-number selector of the pushbutton type and for transmitting to that generator an enabling signal indicating closure of the hook switch by a subscriber.

BACKGROUND OF THE INVENTION

Conventional pulse generators of this type include, besides the pushbutton selector or keyboard, a memory for the temporary storage of the selection signals and a signal converter or coder translating them into decadic pulse trains with the aid of a timer. The memory, the timer and the coder may be combined in a single integrated-circuit chip, allowing the pulse generator to be dimensioned in a compact manner for interchange with a conventional dialing disk. Operating voltage from the line in the open position of the hook switch keeps the pulse generator in a state of readiness and also permits it to transmit incoming call signals to a local ringer, for example. In order to enable the memory to retain the stored data as long as required, the interface unit must also supply operating voltage to the signal generator when the hook switch is closed even though the resistance of that unit, as seen from the central office, should be very low during that phase. Known interface circuits perform only some of these functions so that, for example, two separate circuits must be used for energizing the pulse generator in the open-loop and the closed-loop condition.

OBJECTS OF THE INVENTION

Thus, an object of our present invention is to provide an interface unit serving both as a feeder for the associated pulse generator under all operating conditions and as a repeater of dial pulses emitted by that generator.

Another object is to provide means in such an interface unit for protecting its components against both overvoltages and overcurrents.

SUMMARY OF THE INVENTION

An interface unit according to our invention comprises a rectifier bridge with an input diagonal inserted in a conductor of the line loop, in series with the parallel combination of the hook switch and a high-ohmic shunt resistor, and with an output diagonal connected across an impedance network from which two supply leads extend to the pulse generator for feeding same with operating voltage of the proper polarity irrespectively of the position of the hook switch. The network has a resistive shunt branch including switchover means responsive to a rise in line voltage, due to closure of the hook switch, for significantly lowering the resistance of the shunt branch with resulting reduction in the supplied operating voltage. An outgoing conductor extends from the shunt branch to the pulse generator for signaling the closure of the hook switch while an incoming conductor, carrying dial pulses from the generator to the network upon manipulation of the pushbutton selector, triggers a pulse receiver in that network for reversing the switchover means in the closed hook-switch position to raise the resistance of its shunt branch to a value high enough to approach an open-circuit condition of the line loop.

Pursuant to a more particular feature of our invention, the switchover means of the impedance network in the interface unit comprises a pair of complementary transistors connected in parallel across the output diagonal of the bridge, i.e. between a first and a second terminal thereof, while being coupled to each other by a positive-feedback circuit causing an avalanche-type changeover between cutoff and saturation. One of these complementary transistors has its emitter connected to one of the outgoing supply leads, namely a lead energized from the first bridge terminal, a collector connected via a low-ohmic voltage divider to the second bridge terminal, and a base connected to a biasing circuit extending between these terminals across the output diagonal of the bridge. The other complementary transistor has its emitter connected to the second bridge terminal, its base connected to a tap of the low-ohmic voltage divider, and its collector connected to the other outgoing supply lead which is energized from the second terminal through a high-ohmic series resistor. Advantageously, a Zener diode of low breakdown threshold lies in series with the second complementary transistor to provide a predetermined operating voltage for the pulse generator when that transistor is saturated upon closure of the hook switch. Fluctuations in the operating voltage, especially during the emission of dial pulses, can be minimized by a capacitor connected across the low-threshold Zener diode while another Zener diode, of substantially higher threshold, prevents excessive rises in that voltage when the switchover transistors are cut off.

The pulse receiver responsive to the selection signals may be a third transistor with its emitter connected to a reference point such as the first bridge terminal, its collector tied to the base of the first switchover transistor, and its base connected to the incoming conductor carrying the dial pulses. This third transistor can also be used as an overcurrent sensor by having its emitter and base connected across a low-ohmic input resistance in series with the bridge. For protection against overvoltage we prefer to provide a further Zener diode connected across the first switchover transistor and its voltage divider.

BRIEF DESCRIPTION OF THE DRAWING

The above and other features of our invention will now be described in detail with reference to the accompanying drawing in which.

SPECIFIC DESCRIPTION

Figure 1:
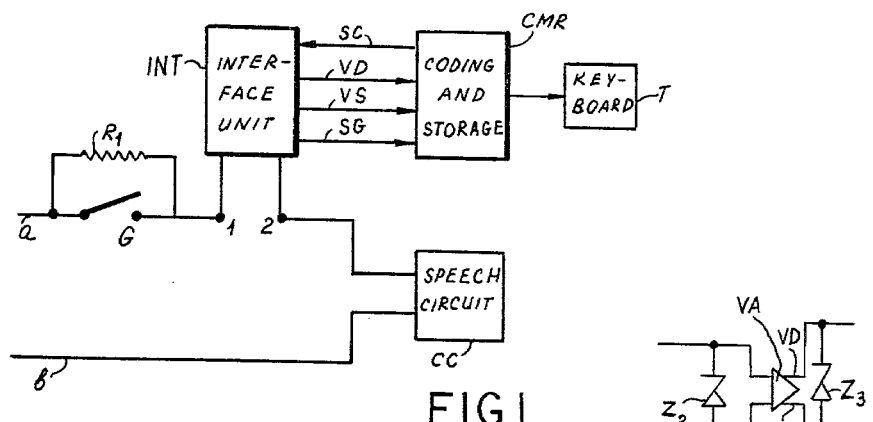
FIG. 1 is a block diagram of part of a subscriber line provided with a pushbutton-actuated pulse generator and an interface unit according to our invention.

In FIG. 1 we have shown two conductors a and b which form part of a line loop connecting a subscriber's station to a nonillustrated central office of a telephone system whose central battery keeps these conductors in a state of permanent energization. Conductor a is interrupted at a hook switch G bridged by a high-ohmic shunt resistor $R_1$, the parallel combination of switch G and resistor $R_1$ being connected to an input terminal 1 of an interface unit INT more fully illustrated in FIG. 2. Another input terminal 2 of unit INT is connected to an extension of conductor a which together with conductor b forms part of a speech circuit CC including the subscriber's telephone receiver. Interface unit INT supplies operating voltage via two leads VD and VS to a coding and storage unit CMR, incorporated in an I-C chip, which together with an associated pushbutton selector or keyboard T constitutes a pulse generator of the type discussed above. Thus, depression of any pushbutton or key of selector T gives rise to one or more dial pulses received by unit INT on an incoming conductor SC, provided that the pulse generator has been activated by an enabling signal on an outgoing conductor SG whose state of energization indicates closure of the hook switch G. With the exception of unit INT, the elements shown in FIG. 1 are all well known in the art. The assembly INT, CMR, T connected across line terminals 1, 2 could be replaced by, or serve as a replacement for, a coventional dialing disk.

Figure 2:
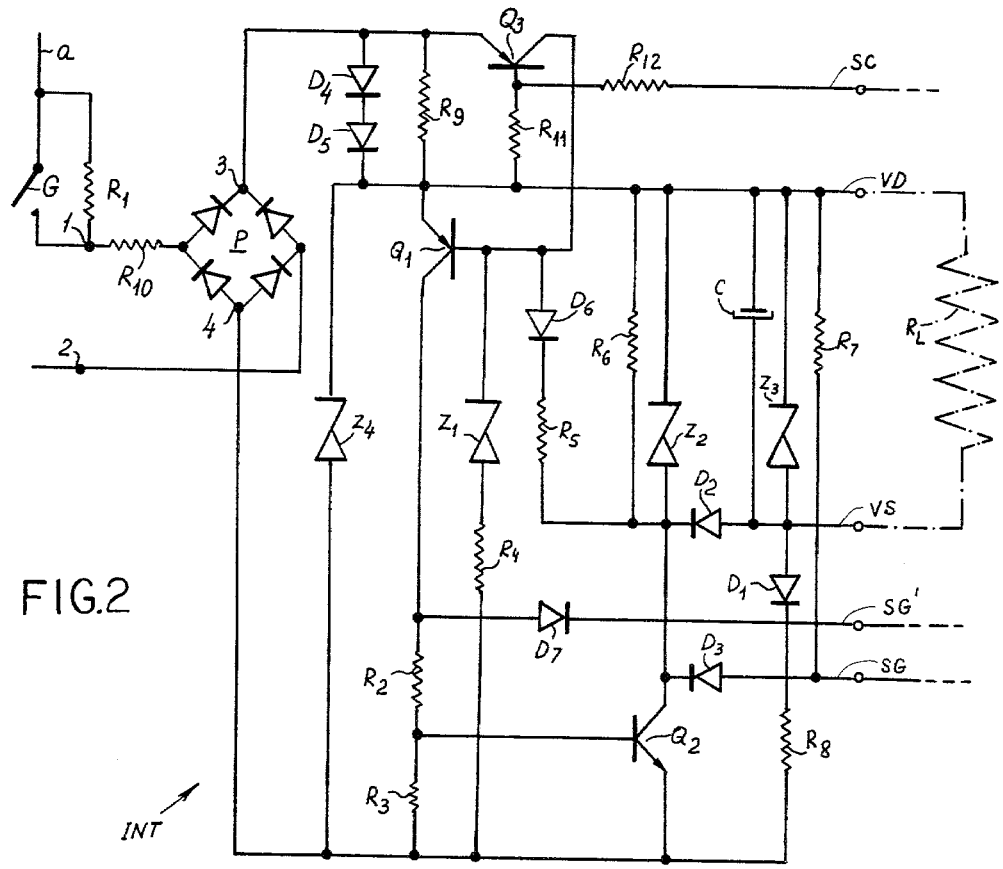
FIG. 2 is a detailed circuit diagram of the interface unit of FIG. 1.

FIG. 2 shows interface unit INT as comprising a low-ohmic input resistor $R_{10}$ inserted between terminal 1 and a rectifier bridge P lying with its input diagonal between terminals 1 and 2. The output diagonal of the bridge is defined by two terminals 3 and 4, terminal 3 being connected to supply lead VD through a low-ohmic circuit including a resistor $R_9$ shunted by two cascaded diodes $D_4$ and $D_5$ which are connected in aiding relationship with the bridge diodes. Also connected between bridge terminal 3 and lead VD is the input of a PNP transistor $Q_3$ whose emitter is tied to terminal 3 and whose base is connected on the one hand, via a small resistor $R_{11}$, to supply lead VD and on the other hand, via a larger resistor $R_{12}$, to incoming conductor SC.

Another PNP transistor $Q_1$ has its emitter tied to lead VD, its base connected to the collector of transistor $Q_3$ and its collector joined to bridge terminal 4 by way of a voltage divider formed by two low-ohmic resistors $R_2$ and $R_3$. A tap of this divider, namely the junction of resistors $R_2$ and $R_3$, is tied to the base of an NPN transistor $Q_2$ whose emitter is joined to terminal 4 and whose collector is connected to lead VD via a Zener diode $Z_2$ of low breakdown threshold shunted by a starting resistor $R_6$. The collector of transistor $Q_2$ is further connected, via a diode $D_2$, to supply lead VS which is linked with supply lead VD via a Zener diode $Z_3$ of substantially higher breakdown threshold shunted by a stabilizing capacitor C. A large resistor $R_8$ in series with a diode $D_1$ is inserted between output terminal 4 and supply lead VS, these two impedance elements also forming part of a biasing circuit for transistor $Q_1$ which further includes the diode $D_2$ and the resistor $R_6$. The base of transistor $Q_1$, aside from being tied to the collector of transistor $Q_3$, is connected through a diode $D_6$ and a further resistor $R_5$ to the junction of resistor $R_6$ with rectifying diode $D_2$, Zener diode $Z_2$ and the collector of transistor $Q_2$; this base is also connected to terminal 4 through a Zener diode $Z_1$ in series with a resistor $R_4$, of substantially larger magnitude than resistors $R_2$ and $R_3$, which are also part of the aforementioned biasing circuit. A fourth Zener diode $Z_4$ lies between lead VD and terminal 4.

The outgoing conductor SG of FIG. 1 can be connected to any suitable intermediate point of the shunt branch of the network constituted by the two complementary transistors $Q_1$ and $Q_2$ with impedance elements in series therewith. In FIG. 2, conductor SG is shown connected via a diode $D_3$ to the collector of transistor $Q_2$ and via a resistor $R_7$ to supply lead VD; we have also indicated an alternate conductor SG' connected by way of a diode $D_7$ to the collector of transistor $Q_1$. A load impedance $R_L$, represented in phantom lines as lying between supply leads VD and VS, symbolizes the input resistance of the pulse generator CMR, T of FIG. 1.

In the disengaged state of the subscriber line, i.e. with hook switch G open, transistors $Q_1$-$Q_3$ are cut off as a small biasing current passes via resistors $R_1$ and $R_{10}$, output terminal 3 of bridge P, resistor $R_9$ in parallel with diodes $D_4$ and $D_5$, resistor $R_6$, the reverse resistance of diode $D_2$, the forward resistance of diode $D_1$, resistor $R_8$ and bridge terminal 4 to line terminal 2. The large reverse resistance of diode $D_2$, representing almost an open circuit, lets substantially the entire line voltage appear between supply leads VD and VS. As seen from the central office, unit INT then has a very high resistance essentially given by the sum of load resistance $R_L$ and series resistor $R_8$.

Figure 3:
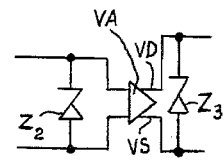
FIG. 3 is a fragmentary circuit diagram illustrating a partial modification.

When the subscriber closes the hook switch G, terminal 3 goes more positive along with the emitter of transistor $Q_1$ whereby this transistor becomes conductive as its base current breaks down the Zener diode $Z_1$. The resulting voltage drop across resistor $R_3$ biases transistor $Q_2$ into conduction, thereby driving the base of transistor $Q_1$ more negative and enhancing the conductivity thereof. This mutual positive feedback between the two complementary transistors $Q_1$ and $Q_2$ causes an avalanche effect quickly leading to their saturation. In the saturated state, the voltage drop across resistor $R_5$ maintains the conduction of Zener diode $Z_1$ while Zener diode $Z_2$ also conducts in series with transistor $Q_2$ so that the line loop appears virtually short-circuited as seen from the central office. If the small residual voltage drop across Zener diode $Z_2$ is insufficient for proper operation of coding and storage unit CMR (FIG. 1), a voltage amplifier VA may be inserted between the network of FIG. 2 and the supply leads VD, VS as illustrated in FIG. 3. The saturation of transistor $Q_2$ also lowers the potential of outgoing conductor SG whereas the voltage drop across divider $R_2$, $R_3$ raises the potential of conductor SG'; thus, depending on the character of unit CMR, closure of the hook switch G may be signaled from interface unit INT either as an increase or as a decrease of the conductor potential.

Since capacitor C has a high impedance for low-frequency changes in line voltage, raw-rectified ringing currents arriving from the central office in the open state of the hook switch can be picked up by a suitable sensing circuit in chip CMR to actuate a call-signal generator of the subscriber station.

When the subscriber operates the keyboard T after closing the hook switch G, one or more dial pulses are transmitted via conductor SC to the base of transistor $Q_3$. Such a dial pulse, assumed to be negative with reference to the supply voltage on lead VD, turns on the transistor $Q_3$ and thus drives the base of transistor $Q_1$ more positive than its emitter, thereby cutting off the two complementary transistors $Q_1$ and $Q_2$. For the duration of the dial pulse, therefore, the line loop again approaches an open-circuit condition. With hook switch G still closed, the termination of the dial pulse cuts off the ancillary transistor $Q_3$ and restores the saturation of switchover transistors $Q_1$ and $Q_2$ whereupon the selection of the call number of a remote party can continue. Capacitor C minimizes the fluctuations of the potential of lead VS during dialing but has no significant effect upon the operation of the switchover transistors.

The presence of Zener diode $Z_3$ in parallel with capacitor C limits the voltage difference between supply leads VD and VS at times of nonconductivity of Zener diode $Z_2$, thereby also protecting the chip CMR against transients which may come into existence during dialing or upon the opening of the hook switch. Zener diode $Z_4$ provides similar overvoltage protection for transistors $Q_1$ and $Q_2$ while resistor $R_{10}$ limits the current flow through that Zener diode upon cutoff of these transistors. Further overcurrent protection is provided by the ancillary transistor $Q_3$ which conducts, even in the absence of a dial pulse, in response to an excessive voltage drop across circuit $D_4$, $D_5$, $R_9$ to reduce conduction of transistors $Q_1$ and $Q_2$. Zener diode $Z_1$ prevents a complete cutoff under these circumstances while providing an alternate path, independent of transistor $Q_2$, for the collector current of transistor $Q_3$.

The two cascaded diodes $D_4$ and $D_5$ could be replaced by a low-threshold Zener diode or by another resistor in parallel with resistor $R_9$; the latter could also be used alone to form a low-ohmic connection between bridge terminal 3 and supply lead VD.

It will be apparent that the conductivity types of the several transistors could be interchanged with reversal of the diodes of bridge P and in the impedance network of unit INT.

We claim:

1. In a telecommunication system wherein a hook switch in parallel with a high-ohmic shunt resistor is inserted in a line loop in series with a generator of dial pulses including a pushbutton selector and a signal coverter provided with digit-storing means, the combination therewith of an interface unit interposed between said hook switch and said generator, said interface unit comprising:

a rectifier bridge having an input diagonal and an output diagonal, said input diagonal being inserted in a conductor of said line loop in series with the parallel combination of said shunt resistor and said hook switch;

an impedance network connected across said output diagonal, said network being provided with two supply leads for delivering operating voltage to said generator irrespectively of the position of said hook switch, said network further having a resistive shunt branch including switchover means responsive to a voltage rise across said input diagonal due to closure of said hook switch for significantly lowering the resistance of said shunt branch with resulting reduction in said operating voltage;

an outgoing conductor extending from said shunt branch to said generator for signaling the closure of said hook switch; and an incoming conductor extending from said generator to said network for carrying dial pulses generated upon manipulation of said pushbutton selector, said network further including pulse-receiving means connected to said incoming conductor for reversing said switchover means in the closed position of said hook switch to raise the resistance of said shunt branch to a value high enough to approach an open-circuit condition of said line loop.

2. The combination defined in claim 1 wherein said switchover means comprises a pair of complementary transistors connected in parallel across said output diagonal and coupled to each other by a positive-feedback circuit.

3. The combination defined in claim 2 wherein said switchover means further comprises a biasing circuit connected across said output diagonal; one of said complementary transistors having a first emitter connected to one of said supply leads energized from one end of said output diagonal, a first collector connected via a low-ohmic voltage divider to the other end of said output diagonal, and a first base connected to said biasing circuit; the other of said complementary transistors having a second emitter connected to said other end of said output diagonal, a second base connected to a tap of said voltage divider, and a second collector connected to the other of said supply leads energized from said other end of said output diagonal through a high-ohmic series resistor.

4. The combination defined in claim 3, further comprising a low-threshold Zener diode inserted between said one of said supply leads and said second collector.

5. The combination defined in claim 4 wherein said biasing circuit includes a starting resistor in shunt with said Zener diode.

6. The combination defined in claim 5 wherein said biasing circuit further includes said series resistor and the reverse resistance of a rectifier diode inserted between said series resistor and said starting resistor.

7. The combination defined in claim 4, 5 or 6, further comprising a capacitor connected across said supply leads and a high-threshold Zener diode in parallel with said capacitor.

8. The combination defined in claim 3, 4, 5 or 6 wherein said outgoing conductor is connected to one of said collectors.

9. The combination defined in claim 3, 4, 5 or 6 wherein said biasing circuit includes a Zener diode connected in series with a resistor between said first base and said other end of said output diagonal.

10. The combination defined in claim 3, 4, 5 or 6, further comprising a protective Zener diode connected across said one of said complementary transistors and said voltage divider.

11. The combination defined in claim 10, further comprising a low-ohmic protective resistor in series with said input diagonal.

12. The combination defined in claim 3, 4, 5 or 6 wherein said pulse-receiving means comprises a third transistor with a third emitter connected to a reference point of said network, a third collector connected to said first base, and a third base connected to said incoming conductor.

13. The combination defined in claim 12 wherein said one end of said output diagonal constitutes said reference point and is connected to said first emitter and to said one of said supply leads through a low-ohmic input resistance.

14. The combination defined in claim 13 wherein said input resistance includes diode means in aiding relationship with said bridge.

15. The combination defined in claim 4, 5 or 6, further comprising voltage-amplifying means inserted between said supply leads and said generator.

* * * * *